(12) United States Patent
Singla Casasayas

(10) Patent No.: US 8,778,818 B2
(45) Date of Patent: Jul. 15, 2014

(54) ANTI-VANDALISM FABRIC SUITABLE FOR UPHOLSTERING SEATS

(71) Applicant: Fabricacion Asientos Vehiculos Industriales, S.A., Martorelles (ES)

(72) Inventor: Juan Singla Casasayas, Martorelles (ES)

(73) Assignee: Fabricacion Asientos Vehiculos Industriales, S.A., Martorelles (ES)

( * ) Notice: Subject to any disclaimer, the term of this patent is extended or adjusted under 35 U.S.C. 154(b) by 0 days.

(21) Appl. No.: 13/851,566

(22) Filed: Mar. 27, 2013

(65) Prior Publication Data

US 2013/0260170 A1 Oct. 3, 2013

(30) Foreign Application Priority Data

Mar. 29, 2012 (EP) .................................. 12382114

(51) Int. Cl.
*B32B 5/26* (2006.01)

(52) U.S. Cl.
USPC ........... 442/319; 442/308; 442/309; 442/310; 442/316; 442/366; 442/368; 442/381; 442/391; 442/402

(58) Field of Classification Search
USPC ......... 442/189, 192, 197, 198, 228, 229, 238, 442/268, 270, 308, 309, 310, 316, 319, 334, 442/335, 340, 366, 368, 376, 377, 402, 415
See application file for complete search history.

(56) References Cited

U.S. PATENT DOCUMENTS 5,733,620 A * 3/1998 Baader et al. ................ 428/40.1
6,025,282 A * 2/2000 Dewaegheneire et al. ........ 442/6

FOREIGN PATENT DOCUMENTS

| DE | 4241973 A1 | 6/1994 |
|---|---|---|
| EP | 0190064 A1 | 8/1986 |
| EP | 0639946 A1 | 3/1995 |
| EP | 0945578 A1 | 9/1999 |
| EP | 1428458 A1 | 6/2004 |
| FR | 2877876 A1 | 5/2006 |
| GB | 2018323 A | 10/1979 |

* cited by examiner

*Primary Examiner* — Andrew Piziali
(74) *Attorney, Agent, or Firm* — Sughrue Mion, PLLC

(57) ABSTRACT

An anti-vandalism fabric having at least one thread intertwined with itself forming a mesh, the thread in turn being formed by a bundle of between 3 and 14 filaments or a combination of filaments and yarns not plaited with one another, of which at least 3 are metal filaments, the metal filaments of the bundle having a diameter between 0.05 mm and 0.09 mm. The fabric can include more than one mesh. In one variant the mesh or meshes are embedded in a panel of non woven fabric.

11 Claims, 3 Drawing Sheets

ANTI-VANDALISM FABRIC SUITABLE FOR UPHOLSTERING SEATS

CROSS REFERENCE TO RELATED APPLICATIONS

This applications is based on European Patent Application No. EP 12382114.2 filed on Mar. 29, 2012, in the European Patent Office, the entire content of which is hereby incorporated by reference.

TECHNICAL FIELD OF THE INVENTION

The present invention relates to an anti-vandalism fabric, particularly applicable for upholstering seats of public transport vehicles. The fabric is of those which comprise a mesh the mechanical properties of which confer suitable cut resistance to the fabric to protect the upholstered object against tearing or cutting by sharp objects.

BACKGROUND OF THE INVENTION

Different types of anti-vandalism fabrics with a wide variety of applications are known today, such fabrics are generally made up of a series of superimposed layers between which there is arranged a metal reinforcement mesh. Said mesh tends to be embedded between layers of textile material or synthetic foam. These meshes are mostly formed by threads, cables or wire of specific thickness preventing a sharp object such as a knife from penetrating and cutting the fabric.

By way of example, patent application EP0945578 proposes a vandalism-resistant panel including a flexible wire skeleton embedded in a layer of polymer material.

Patent EP1428458 discloses a multiplayer complex comprising a metal reinforcement layer made by means of intertwining, comprising a weft thread and a warp thread characterized in that the weft thread has a square or rectangular section and in that the warp threads joining the weft threads have a diameter comprised between 0.1 and 0.6 mm.

Patent EP0639946 relates to a seat cover comprising a thin layer of a compact elastomer in which there is partially embedded a continuous layer of helical metal springs.

In all these fabrics the anti-vandalism features are conferred by the use of a metal wire as weaving thread in mesh production, or as the only thread since it is a stitch woven mesh.

These anti-vandalism fabrics are generally conceived to offer both perforation and cut resistance at the same time, but they are often too stiff, since introduction of any metal frame inside a multiplayer complex makes it stiffer conferring little flexibility and manipulability to the fabric. Additionally, when the metal layer comprises weft threads, the commonly used metal threads usually have a diameter greater than 0.1 mm to prevent cutting the fabric or to make it difficult.

Particularly, when these anti-vandalism fabrics are used in vehicle seats a greater flexibility is necessary facilitating the manipulation thereof, increasing the upholstery quality and that said fabrics do not form permanent creases when they are folded, while at the same time they must have sufficient cut and perforation resistance.

In terms of their capacity to overcome shear stress, the features offered by currently known fabrics are not very compatible with the other aforementioned requirements. Therefore, the use of stainless steel threads with a diameter of the order of tenths of a millimeter in meshes, for example, allows overcoming the shear tests necessary to present the fabric as a fabric with certain anti-vandalism properties, however the thickness of these threads causes permanent fabric deformations when it is folded, often leaving crease lines around which the fabric has been folded. This effect means that either the fabrics cannot be used for lining or upholstering objects with a complex configuration, or that they are not of interest because they do not offer attractive enough finishes for the manufacturer of the objects to be upholstered, such as the case of manufacturers of industrial seats or seats intended for public transport which are conventionally more likely to be vandalized due to their exposure to the general public.

The first objective of the invention is therefore a fabric which offers sufficient cut resistance so as to be considered as an anti-vandalism fabric but which at the same time is provided with good flexibility and adaptability or which even improves these properties with respect to the fabrics known today.

A second objective of the present invention is that the metal skeleton is compatible with conventional finishing operations to which such fabrics are subjected, such as for example the operations performed to embed the metal skeleton in a panel of non woven fabric is also.

A solution which fulfills the requirements described above and which can be obtained by using the tools, specifically weaving machines on the market, and which requires no special adaptation thereof for fabric production in order to enable offering a solution with a market appropriate cost is also an object of the invention.

Finally, it is of interest that the solution according to the invention can be applied in other fields of the art different from that of seat upholstery, such as for example in technical or protective clothing production.

SUMMARY OF THE INVENTION

The anti-vandalism fabric object of the invention is of those comprising at least one thread intertwined with itself forming a mesh the fabric being characterized in that said thread is in turn formed by a bundle of between 6 and 14 filaments or a combination of filaments and yarns, wherein said filaments or combination of filaments and yarns are not plaited with one another. This bundle comprises at least 5 metal filaments, the metal filaments of the bundle having a diameter comprised between 0.05 mm and 0.09 mm.

Unlike the trend set by the state of the art, the inventors have resolved to not use single-stranded metal threads for producing the mesh but threads formed, like a cord, by a bundle of strands which include metal filaments. This solution involves the use of metal filaments of a significantly reduced thickness in comparison with the conventional wires of tenths of a millimeter, which would deter the skilled person from using said filaments when pursuing high cut resistance. Nevertheless, the experience has demonstrated that the use of a bundle comprising metal filaments having a thickness of the order of hundredths of a millimeter increases the mesh performance as will be described below and the drawbacks associated with the use of thick wires, such as permanent fabric deformations when it is folded, are prevented.

In one embodiment, the metal filaments are aisi 304 stainless steel metal filaments with a resistance coefficient between 110 and 160 kg/mm$^2$, and an elasticity of 0 to 6%.

One of the effects caused by the bundle of filaments or a combination of filaments and yarns is that, under stress conditions caused by a cutting tool or the like, said filaments or a combination of filaments and yarns are dragged and grouped together increasing the contact surface with the cutting tool and therefore making slitting the material in order to cut it difficult.

This effect is further intensified when the fabric is a non flat fabric having two-way elasticity. A preferred embodiment is therefore that in which the thread formed by a corresponding bundle of filaments or a combination of filaments and sun yarns is arranged in a curved, intertwined with itself, forming the mesh.

Preferably, the mesh is a weft mesh with a plain stitch tricot structure.

The elasticity of the mesh reduces the stiffness offered by the thread subjected to the shear stress, therefore making cutting difficult.

In a variant of the invention, the bundle of filaments comprises in addition to stainless steel filaments, polyester filaments, wool yarns or a combination thereof.

In one embodiment the fabric comprises a single mesh and the thread forming it is formed by a bundle of between 6 and 14 filaments or a combination of filaments and yarns which are not plaited with one another, of which at least 5 are metal filaments.

In another embodiment, the fabric comprises a first and a second mesh superimposed with and sewn to one another by means of at least one joining thread a double mesh structure being obtained, both first and second meshes being formed by threads which are in turn formed by respective bundles of filaments or a combination of filaments and yarns which are not plaited with one another according to the invention.

The joining thread is preferably non metal thread.

In a variant of interest of this embodiment, the first and second meshes have the same number of metal filaments.

In a specific embodiment, the thread forming the first mesh is formed by a bundle of 7 filaments or a combination of filaments and yarns, of which 5 are stainless steel filaments; whereas the thread forming the second mesh is also formed by a bundle of 7 filaments or a combination of filaments and yarns, of which 5 are stainless steel filaments.

According to another feature of the invention, the mesh or meshes are embedded in a panel of non woven fabric. Said non woven fabric preferably comprises para-aramid or twaron fibers.

According to another feature of the invention, the mesh or meshes are embedded in the non woven fabric by means of needle punching the non woven fabric in the meshes or by means of a laminating process.

The non woven fabric is preferably formed by para-aramid fibers in an amount between 60 and 150 g/m².

The anti-vandalism fabric of the present invention is preferably intended for the production and manufacture of tapestries susceptible to incivilities, such as tearing or cutting by means of penknives or similar sharp instruments. By way of non-limiting example said anti-vandalism fabric can also be used in truck tarpaulins, removable roofs for automobiles, safety vests, tarpaulins for rail transport, awnings for shops and circus tarpaulins, suitcases, high-speed doors for storage hangars, protective partitions, seat covers, etc.

DETAILED DESCRIPTION OF THE INVENTION

Figure 1:
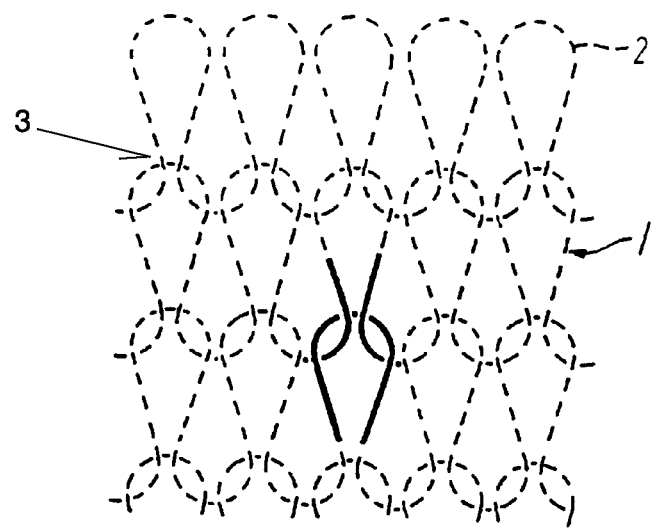
FIG. 1 shows a partial view illustrating a plain stitch tricot structure used in manufacturing a mesh for a first embodiment of the fabric according to the invention.

FIG. 1 shows a schematic view of a mesh 3 with the curved thread 1 forming the characteristic linked double s, the stitch formation being distinguished through a portion of the loop 2, an intertwining being formed circumferentially. Each intertwined thread 1 forming the mesh with a plain stitch structure is in turn formed by a bundle of between 6 and 14 continuous strands which are not plaited with one another, an example in which the thread is formed by nine strands indicated with references 101 to 109 being depicted in FIG. 2.

Said strands 101 to 109 are intentionally not plaited with, wound or intertwined with one another, although a strand can occasionally intersect with a strand contiguous thereto.

In the bundle formed by nine strands, six are stainless steel filaments and the rest may be polyester filaments or yarns or wool yarns, the possibility of there being polyester filaments or yarns and wool yarns in one and the same bundle being contemplated.

The mesh 3 of FIG. 1 can be obtained by means of a knitting machine, fed such that the bundle of filaments or combination of filaments and yarns behaves as a single unit, as if it is one and the same thread. Even when a variant of the invention with a steel filament diameter close to the upper threshold of the range claimed is chosen, the machine tolerates the use of a bundle with up to 12 stainless steel filaments as the thread.

Figure 3:
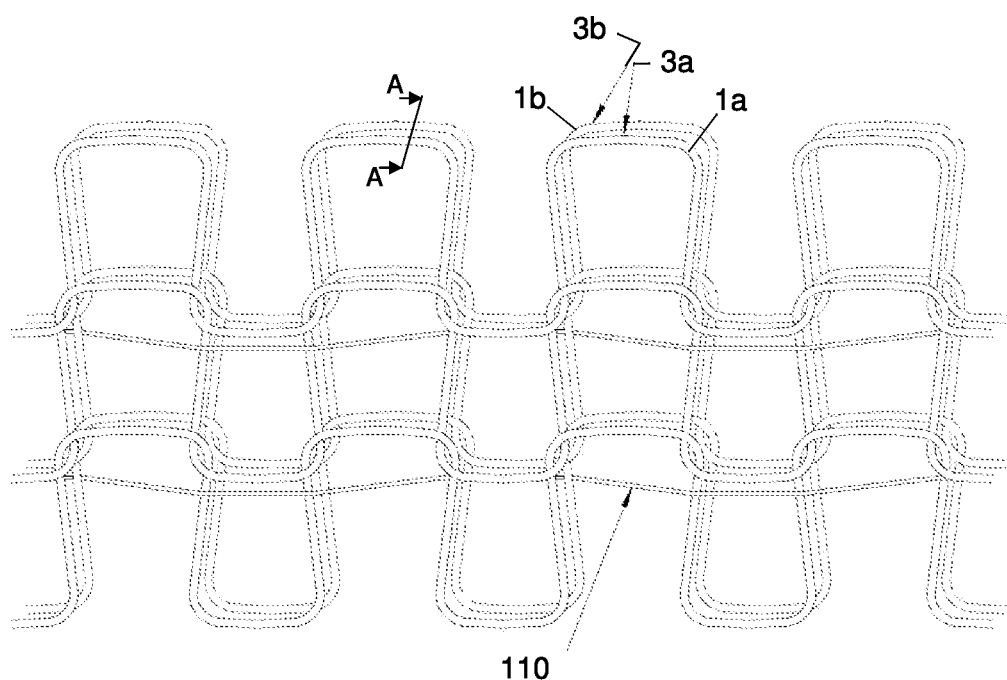
FIG. 3 shows a partial view of a double mesh structure for a second embodiment of the fabric according to the invention.

The mesh 3 obtained is then embedded in a panel of non woven fabric 4, for example twaron or para-aramid, as illustrated by the photograph of FIG. 3, for obtaining the fabric 5 according to the invention.

With this intention, known techniques can be used without the thread being formed by a bundle of filaments, or a combination of filaments and yarns, having any drawback.

Therefore using the technique of needle punching the non woven fabric on the mesh in an amount of 150 to 200 grams/m², or laminating, is, for example, contemplated. In the latter, the inclusion of wool threads in the bundle of filaments is recommended to favor the mesh adhesion, by way of sandwiching between two sheets of non woven fabric, with the use of industrial glues or a light polyurethane adhesive or the like.

Figure 4:
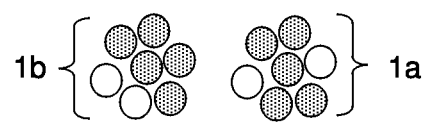
FIG. 4 is a schematic view of a section according to the plane of section AA of FIG. 3.
Figure 5:
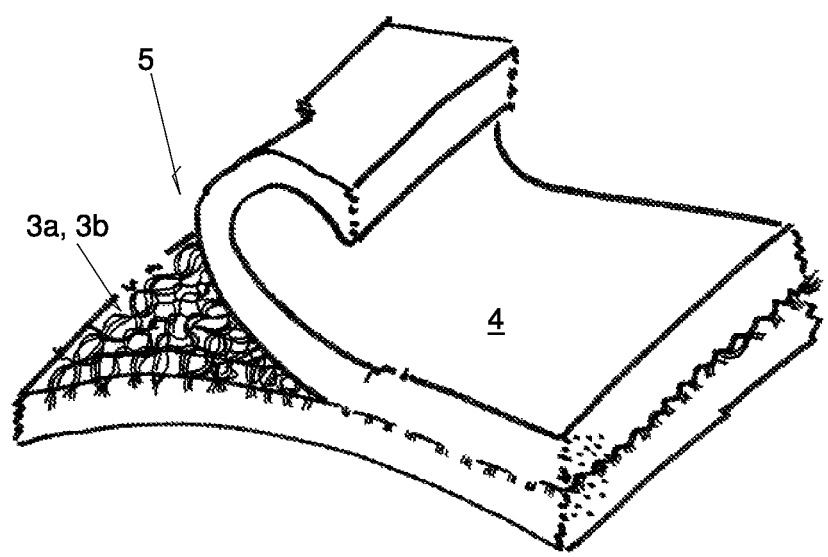
FIG. 5 is a schematic drawing of a fabric according to the invention with a partially exposed double mesh.

FIG. 3 shows an alternative structure for the mesh 3 of FIG. 1. The structure of FIG. 3 is formed by a first and a second mesh 3a and 3b the threads 1a and 1b of which are in turn formed, as illustrated in FIG. 4, by respective bundles of strands. The meshes 3a and 3b have been knitted simultaneously with one and the same machine which further sews said first and second meshes 3a and 3b by means of a joining thread 110, which can be for example a wool thread.

This double mesh structure of FIG. 3 is particularly advantageous when the total number of metal filaments used is equal to or greater than 8. Under these circumstances a single mesh will tend to wind upon itself in an undesired manner for certain specific fabric uses, making the subsequent manipulation thereof difficult.

The double mesh structure according to FIG. 3, in which the metal filaments are distributed in two juxtaposed meshes prevents this drawback.

The following examples detail different embodiments of an anti-vandalism fabric according to the invention and must not be understood as limiting same.

EXAMPLE 1

Figure 2:
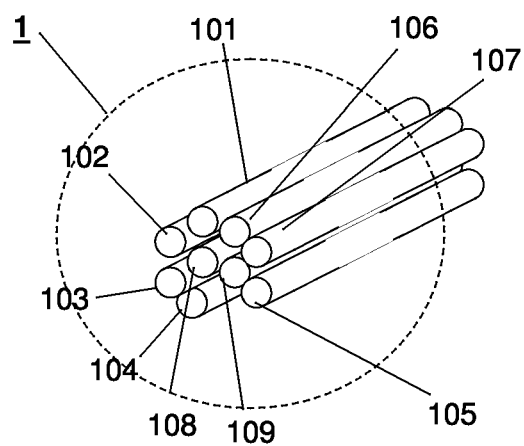
FIG. 2 shows an enlarged and detailed schematic view of the thread forming the mesh of FIG. 1.

The anti-vandalism fabric comprises a mesh in accordance with FIGS. 1 and 2, formed by a thread or threads each of which is in turn formed by a combination of:

6 stainless steel filaments having a diameter of 0.07 mm.
3 wool yarns of between 5 and 9 Nm.

The stainless steel filaments used are aisi 304 with a resistance coefficient between 110 and 160 kg/mm$^2$ and an elasticity of 0 to 6%.

The mesh is embedded in a panel of non woven para-aramid fabric.

EXAMPLE 2

The anti-vandalism fabric comprises a stitched mesh formed by threads which are in turn formed by:

10 stainless steel filaments having a diameter of 0.08 mm.
4 wool yarns of between 5 and 9 Nm.

The stainless steel filaments used are aisi 304 with a resistance coefficient between 110 and 160 kg/mm$^2$ and an elasticity of 0 to 6%.

The mesh is embedded in a panel of non woven twaron fabric.

The fabric according to Example 2 was subjected to the tests necessary for meeting the NF-F 00201 and EN45545 Standards, in both cases in a satisfactory manner.

EXAMPLE 3

The anti-vandalism fabric comprises two meshes sewn to one another forming a double mesh structure according to the FIG. 3. Each mesh is formed by a thread which in turn is formed by a bundle consisting of 5 stainless steel filaments having a diameter of 0.08 mm and 2 wool yarns. The structure thus comprises a total of 10 stainless steel filaments.

The stainless steel filaments used are aisi 304 with a resistance coefficient between 110 and 160 Kg m$^2$ and an elasticity of 0 to 6%.

The double mesh structure is embedded in a panel of non woven twaron fabric.

It has been found that when said fabric is for upholstering seats, the seat recovers its original shape and no permanent creases are formed, such as the case of the previously described anti-vandalism fabrics having metal threads. Consequently, this cover provides the seat with anti-vandalism properties, great elasticity and comfort.

The invention claimed is:

1. An anti-vandalism fabric suitable for upholstering seats comprising at least one thread intertwined with itself forming a mesh, wherein said thread is in turn formed by a bundle of between 3 and 14 filaments or a combination of filaments and yarns, wherein said filaments or combination of filaments and yarns are not plaited with one another, the bundle comprising at least 3 metal filaments, the metal filaments of the bundle having a diameter between 0.05 mm and 0.09 mm, and wherein the mesh is embedded in a panel of non woven fabric.

2. The anti-vandalism fabric according to claim 1, wherein the mesh has a plain stitch tricot structure.

3. The anti-vandalism fabric according to claim 1, wherein the bundle comprises stainless steel filaments, polyester filaments, wool yarns or a combination thereof.

4. The anti-vandalism fabric according to claim 1, comprising a first and a second mesh superimposed with and sewn to one another by means of at least one joining thread, both first and second meshes formed by threads which are in turn formed by respective bundles of filaments or a combination of filaments and yarns wherein said filaments or combination of filaments and yarns are not plaited with one another.

5. The anti-vandalism fabric according to claim 1, wherein the joining thread is a non metal thread.

6. The anti-vandalism fabric according to claim 4, wherein the first and second meshes have the same number of metal filaments.

7. The anti-vandalism fabric according to claim 4, wherein the thread forming the first mesh is formed by a bundle of 7 filaments or a combination of filaments and yarns, of which 5 are stainless steel filaments; and the thread forming the second mesh is also formed by a bundle of 7 filaments or a combination of filaments and yarns, of which 5 are stainless steel filaments.

8. The anti-vandalism fabric according to claim 1, comprising a single mesh, wherein the thread forming said mesh is formed by a bundle of between 6 and 14 filaments or a combination of filaments and yarns which are not plaited with one another, the bundle comprising at least 5 metal filaments.

9. The anti-vandalism fabric according to claim 1, wherein the non woven fabric comprises para-aramid fibers.

10. The anti-vandalism fabric according to claim 1, wherein the mesh is embedded in the non woven fabric by needle punching or laminating.

11. The anti-vandalism fabric claim 1, wherein the metal filaments are aisi 304 stainless steel filaments, with a resistance coefficient between 110 and 160 kg/mm$^2$, and an elasticity of 0 to 6%.

* * * * *